Dec. 29, 1936.                E. G. BERRY                 2,065,557
           MACHINE FOR REMOVING FOREIGN MATTER FROM COFFEE BEANS
                     Filed Aug. 27, 1934         3 Sheets-Sheet 1
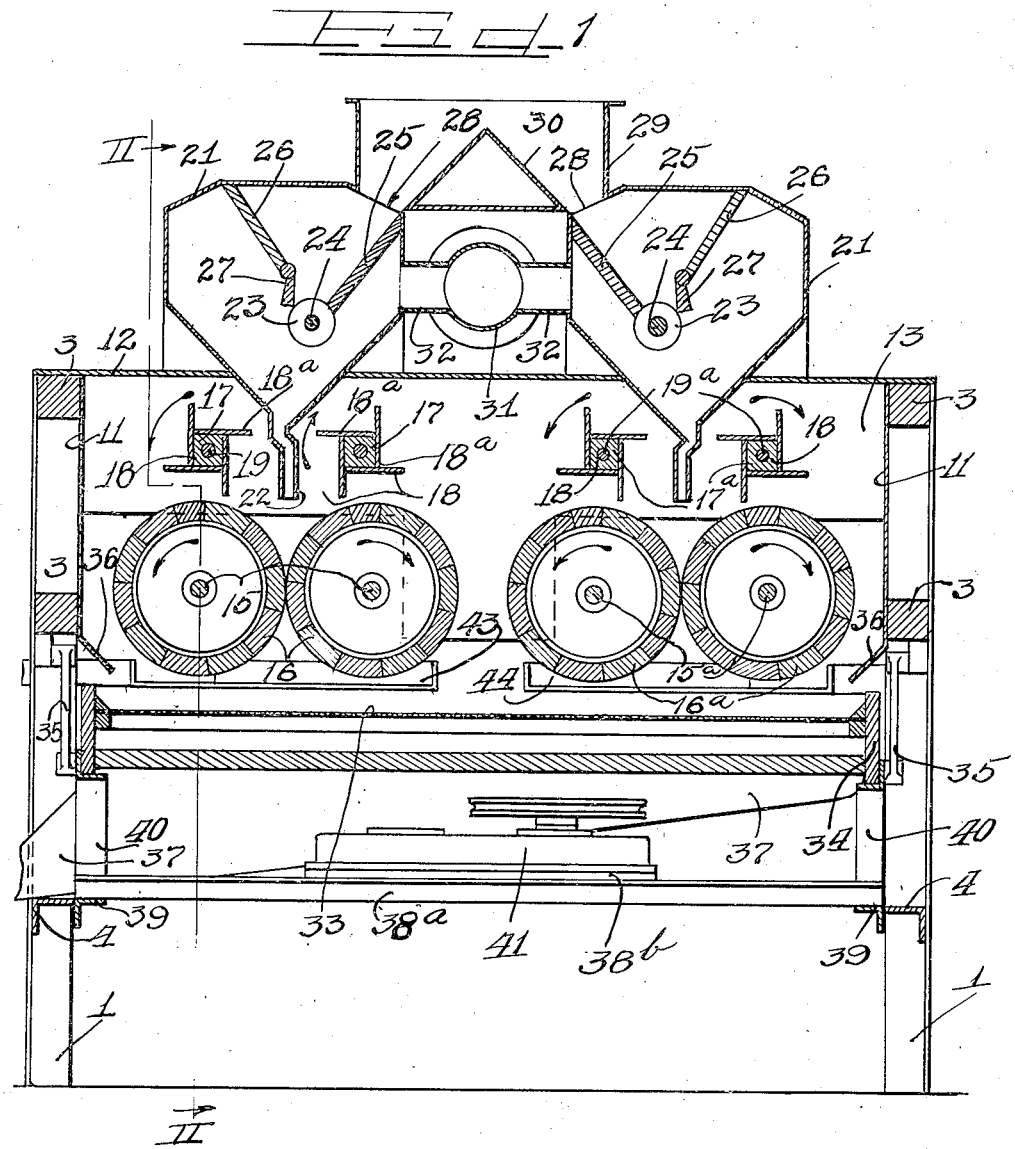
Inventor
Eugene G. Berry.

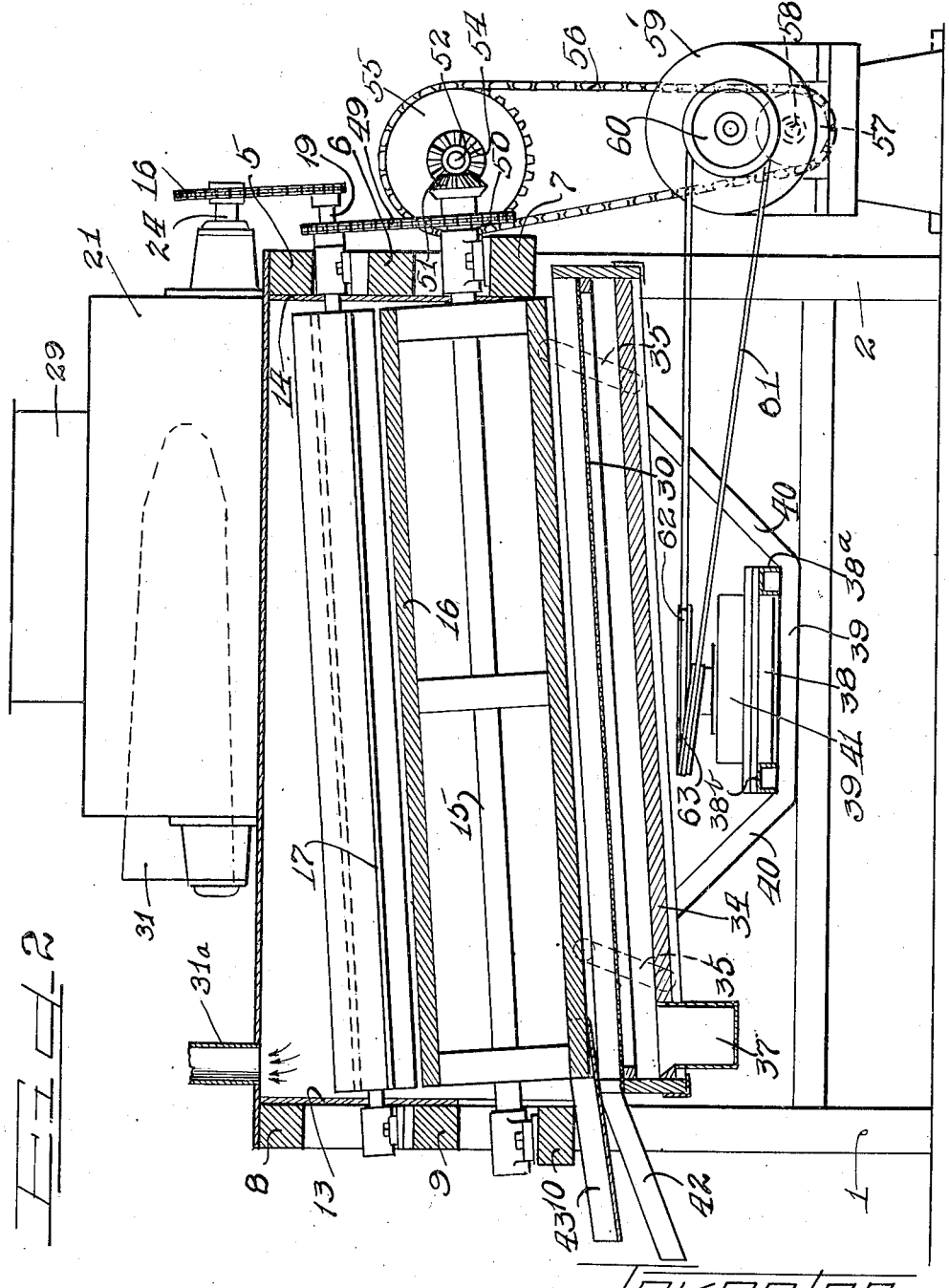

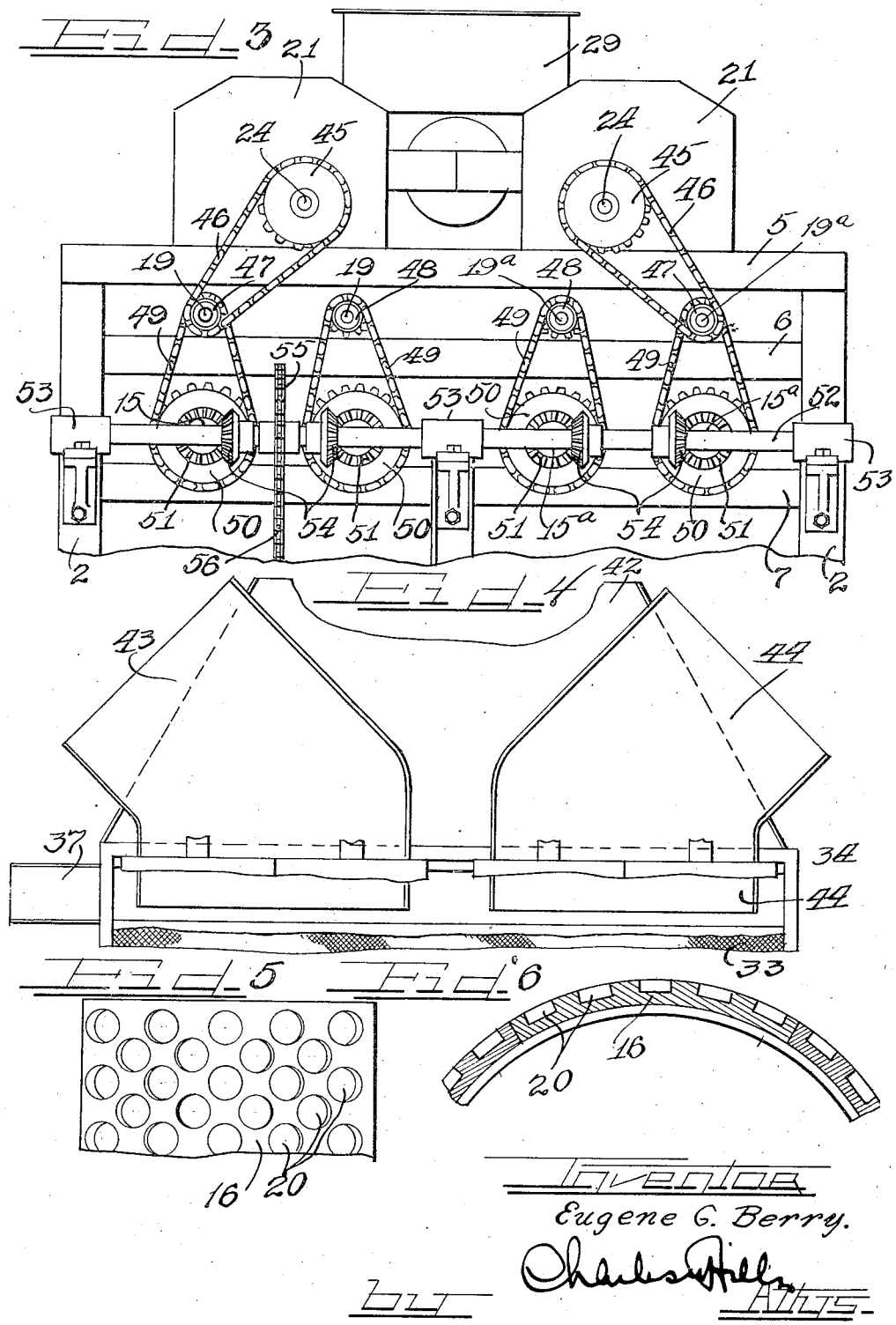
Dec. 29, 1936.  E. G. BERRY  2,065,557
MACHINE FOR REMOVING FOREIGN MATTER FROM COFFEE BEANS
Filed Aug. 27, 1934  3 Sheets-Sheet 3
Inventor
Eugene G. Berry.

Patented Dec. 29, 1936

2,065,557

UNITED STATES PATENT OFFICE 2,065,557

MACHINE FOR REMOVING FOREIGN MATTER FROM COFFEE BEANS

Eugene G. Berry, Indianapolis, Ind., assignor to B. F. Gump Company, Chicago, Ill., a corporation of Illinois Application August 27, 1934, Serial No. 741,656

4 Claims. (Cl. 209—94)

This invention relates to a machine for removing foreign material from coffee.

At the present time, the green coffee beans are imported in bags from tropical countries. Such green coffee usually contains some foreign material, such as small sticks and stones, but especially strings or bag fibres, which have become separated from the bags. It has been more or less of a problem to separate the strings from the green coffee beans. They could not be separated by a screen, since the holes in such screen that would pass the coffee beans would also pass the strings and other foreign material.

According to this invention, the strings from the green coffee beans are effectively removed, together with all other foreign material, including fine dust, so that the green coffee beans can be roasted in a clean state.

The invention comprises the novel structure and combination of parts hereinafter described and more particularly pointed out and defined in the appended claims.

In the accompanying drawings, which illustrate a preferred form of this invention, and in which similar reference numerals refer to similar features in the different views:

Figure 1 is a transverse sectional view through a machine involving this invention, looking toward the front or discharge end of the machine.

Figure 2 is a longitudinal sectional view taken substantially upon the line II—II of Fig. 1, with the motor in elevation and looking in the direction of the arrows.

Figure 3 is a fragmentary rear elevational view of the machine.

Figure 4 is a framentary plan view of the discharge chutes.

Figure 5 is an enlarged fragmentary top plan view of one of the rolls embodying a part of the machine.

Figure 6 is an enlarged fragmentary sectional view of such a roll.

The machine comprises a suitable framework consisting of a pair of front legs or posts 1 and a pair of rear legs 2. The front and rear legs are connected by the frame members 3 and 4. The rear legs 2 are connected by an upper frame member 5 and intermediate frame members 6 and 7. The front legs 1 are connected by an upper frame member 8 and lower frame members 9 and 10. This framework supports a sheet metal casing consisting of side portions 11, a top portion 12, a front portion 13, and a rear portion 14. The front portion 13 is cut away as shown in Fig. 1 to accommodate certain operating mechanism.

A pair of inclined shafts 15 in the same inclined plane, to which are secured cooperating rolls or drums 16, are journalled in suitable bearings upon the frame members 7 and 10. These rolls 16 are positioned horizontally side by side in contacting relation, and the peripheries thereof are indented or provided with recesses 20, as shown in Figures 5 and 6, to receive the coffee beans. It will be noted that the rolls 16 are arranged upon one side of the longitudinal center line of the machine. The rolls 16 rotate in opposite directions; the outer roll rotating in an anti-clockwise direction, and the inner roll rotating in a clockwise direction, for a purpose that will later appear.

A wiper 17 extends longitudinally above each roll 16. Each wiper consists of a long block 18 substantially square in cross-section. A flexible wiper element 18a of rubber or the like is secured upon each face of each block. It will be noted that the free edge portions of these wiper elements extend beyond the edges of the blocks and are adapted for engaging the peripheries of the rolls. The wipers 17 are secured upon shafts 19 which are journalled in bearings upon the front beam 9 and the rear beam 6. These wipers extend in parallel relation to the inclined rolls, and they rotate in opposite directions in order to sweep the strings and other foreign material on the rolls toward the vertical plane between the rolls.

It will be appreciated that these wiper elements 18a also act as fan blades and that the opposite rotation thereof as indicated causes the said blades on the different wipers to coact and create currents of air in an upward direction therebetween and between the upper portions of the rolls. Such currents of air exercise a lifting effect upon the strings, and lint coming from the coffee bags and prevent the same from sticking to the rolls whereby the same will float down over the rolls.

The foregoing rolls and wipers constitute one coffee cleaning unit. Upon the opposite side of the longitudinal center line of the machine, there is a similar coffee cleaning unit consisting of similar inclined rolls 16a mounted upon shafts 15a and similar inclined wipers 17a mounted upon shafts 19a, and having similar wiping elements 18a thereon. In this second unit, the rolls 16a, which are similarly indented as the rolls 16, also rotate in opposite directions, the outer roll rotating in a clockwise direction, and the inner roll rotating in an anti-clockwise direction, as indicated by the arrows. The wipers 17a rotate in opposite directions, as indicated by the arrows.

Each coffee cleaning unit is supplied with a hopper 21 thereabove. Each hopper 21 has a discharge spout 22 directed to a point between the rolls therebeneath. The hoppers are located toward the rear portion of the machine, and portions thereof extend through apertures in the top plate 12.

Adjacent the center of each hopper 21, there is a feed roll 23 secured upon a shaft 24. From each feed roll 23 there extends a diagonal partition member 25 to the inner side of the hopper. From the top of each hopper 21, there extends an inclined partition member 26 toward the rolls. A feed gate 27 is hinged to the lower end of each partition 26 and normally contacts the roll by gravity. The top of each hopper has an inlet opening 28 located between the partitions, with the result that the green coffee beans are admitted to each hopper between the partitions therein, and must pass between the feed rolls 23 and adjustable gates 27, and be fed from each hopper in an orderly fashion. A hopper 29 common to both hoppers 21 is positioned thereabove by being secured to the tops thereof to embrace the openings 28. An inverted V-shaped divider 30 is located in the common hopper 29 and rises from the bottom thereof, which has openings corresponding to the openings 28. This divider 30 will equally distribute the green coffee in the hopper with respect to the openings 28.

An air blast pipe 31 may extend between the hoppers 21, and may be made to communicate therewith by short pipe sections 32 extending through the side walls of said hoppers and attached adjacent openings in said pipe 31. The pipe 31 may extend to a fan for exhausting the dust from the green coffee passing through the hoppers 21, or the dust may be exhausted through a pipe 31$^a$ (Fig. 2) extending from the rear end of the casing. In exhausting the dust through pipe 31$^a$, no strings will be exhausted to the fan.

The coffee beans which are carried in the indentations of rolls 16 and 16$^a$ will drop therefrom by gravity and fall upon an inclined screen 33 therebelow. The screen 33 is mounted in the usual manner in a screen box 34 which is rockably supported from the side frame members 3 by means of pivoted links 35. The lower ends of the sides 11 of the casing are preferably bent inwardly as indicated at 36 (Fig. 1) to deflect the falling coffee beans inwardly. It will be noted that the screen is downwardly inclined toward the discharge end. At the lower end of the screen box there is a transversely extending chute 37 for conveying and discharging the dirt and dust that descends through the screen and gravitates down the bottom of the screen box. With reference to Figure 1, it will be noted that the dirt chute 37 slopes downwardly from one side of the screen box to the other side in order that the dirt may gravitate down the chute and be discharged at one side of the machine into a suitable container.

Below the screen box, there is a transverse support 38 attached at its ends to short angle bars 39 which are provided with upwardly diverging arms 40 attached to the sides of the screen box. The support 38 is shown as consisting of angle bars 38$^a$ connected by a plate 38$^b$. However, any other suitable form of support may be used. Upon this support, there is a centrifugal vibrator 41 for vibrating the screen. The vibrator shown is commercially known as a Juby Drive, but any other form may be used.

At the lower end of the screen 33, there is a metal discharge chute 42 for the cleaned coffee. This chute may be supported in any suitable manner.

Under the forward or lower ends of the rolls 16, there is a discharge chute 43. Beyond the ends of the rolls, the chute 43 is angular in formation so as to discharge upon the side of the chute 42 (Fig. 4). Below the rolls 16$a$, there is a discharge chute 44 that has its outer end portion also directed at an angle outwardly to discharge beyond the side of the coffee chute 42. The chutes 43 and 44 are adapted to receive the strings and the like descending from the rolls 16 and 16$^a$, and they are supported upon the edges of the coffee chute 42 in any convenient manner. The chutes 43 and 44 have side walls or flanges that prevent the descending coffee beans from entering the same.

The mechanism for operating the machine is preferably located at the rear end of the machine, as shown in Figure 3. In referring to this figure, it will be observed that a sprocket gear 45 is secured upon the rear end of each shaft 24. A sprocket chain 46 is trained over each sprocket wheel 45. One sprocket chain is also trained over a small sprocket wheel 47 secured upon the rear end of the outer shaft 19, while the other sprocket chain 46 is trained over a small sprocket wheel 47 on the rear end of the outer shaft 19$^a$.

The outer shaft 19 is connected by a sprocket 48 and chain 49 to a sprocket wheel 50 secured upon the rear end of the shaft 15 of the outer roll 16. The outer shaft 19$^a$ is connected by a similar sprocket 48 and chain 49 to a sprocket gear 50 secured upon the rear end of shaft 15$^a$ supporting the outer roll 16$^a$.

Upon the rear end of inner shaft 19, there is a sprocket wheel 48 connected by a chain 49 to a sprocket wheel 50 secured upon the rear end of the inner shaft 15. Likewise, a sprocket gear 48, chain 49, and sprocket gear 50 connect the inner shaft 19$^a$ to the inner shaft 15$^a$.

Upon the rear end of each roll shaft, there is secured a bevelled pinion 51. Adjacent these pinions there extends a shaft 52 journalled in bearings 53 on the framework as shown. Pinions 54 are secured upon the shaft 52 for meshing relation with the different pinions 51. It will be noted that the two outer-most pinions 54 have their faces or teeth outwardly directed to drive the two outermost roll shafts 15 and 15$^a$, while the two inner pinions 54 have their teeth directed toward each other with the result that when shaft 52 is rotated in a clockwise direction as viewed in Fig. 2, the rolls 16 and 16$^a$ will be rotated as indicated by the arrows in Fig. 1.

A large sprocket wheel 55 is secured upon shaft 52 a short distance from one end. A sprocket chain 56 is trained over this sprocket gear 55, and also over a sprocket gear 57 secured upon a shaft 58 which may be geared to the shaft of a motor 59 in any suitable manner.

One end of the motor shaft carries a pulley 60 over which a belt 61 is trained, that in turn is trained over a pulley 62 on the vibrator 41 for operating the same. The return branch of the belt 61 travels over an oblique idler pulley 63, upon the vibrator.

In the operation of the machine, the green coffee is discharged above the rolls from the hoppers 21 and as it falls upon the rolls, it will gravitate into the indentations or pockets 20 and be carried around with the rolls until it drops from such pockets by gravity, and falls upon the screen. The strings, sticks or the like will also drop upon the rolls, but the wipers 17 and 17$^a$ that rotate in opposite directions to their respective rolls will sweep such strings and the like toward a vertical plane passing through the contacting portions of the rolls. Thus the two wipers 17 acting upon rolls 16 will continue to sweep the strings over the top of the rolls and opposite to the direction of rotation of said rolls. In other words, the wipers will prevent the strings and the like from being carried around with the rolls.

As the wipers continue to sweep the strings or the like between the rolls, such strings and the like will gravitate downwardly longitudinally of the rolls until they fall over the ends of the rolls and upon the chutes 43 and 44. It might be mentioned that the strings cannot pass between the rolls, since the rotation of the rolls tends to elevate anything that might come therebetween.

The dirt and dust that falls through the screen 33 will gravitate down the bottom of the screen box and be discharged by the transverse chute 37.

It will be understood that the pockets 20 in the rolls are sufficiently deep to house the coffee beans without being dislodged therefrom by the action of the wipers.

From the foregoing, it will be apparent that a very effective machine has been invented for cleaning coffee, and especially for removing strings, sticks, and other similar foreign matter therefrom. While the machine is especially designed for handling coffee beans, it is susceptible of cleaning different kinds of cereals.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In a machine for removing strings from coffee beans, a pair of downwardly inclined rolls having peripheral pockets for receiving the coffee beans and a rotatable wiping member above each roll, each wiping member comprising a plurality of spaced rubber strips extending substantially the length of said rolls and periodically contacting the same and serving as fan blades and means for rotating said wiping members in opposite directions and causing the respective rubber strip thereon to coact and produce upwardly directed currents of air for exercising a lifting effect upon said strings and causing the same to float down said inclined rolls.

2. In a machine for removing light foreign matter from beans, a pair of contacting rolls having peripheral pockets for receiving the beans, a rotatable wiping member extending longitudinally above each roll, each wiping member comprising a plurality of flexible strips in radial spaced relation for periodically contacting the roll therebeneath, said flexible strips serving as fan blades and means for rotating said wiping members in opposite directions and causing the same to coact and produce currents of air for exercising a lifting action upon the foreign matter.

3. In a machine for removing foreign matter from beans, a pair of downwardly inclined rolls having peripheral pockets for receiving the beans, a rotatable wiping member extending longitudinally above each roll, each wiping member comprising a plurality of radially extending flexible blades for moving over the rolls, and means for rotating said wiping members in opposite directions and causing the same to create opposing currents of air between the upper portions of said rolls and exercising a lifting action on said foreign matter.

4. In a machine of the class described, a pair of contacting downwardly inclined rolls arranged in the same horizontal plane and having peripheral pockets, a rotatable wiping member extending longitudinally above each roll, each wiping member comprising a plurality of radially extending flexible blades for successively moving over the rolls, said blades serving as fan blades for causing currents of air between the upper portions of said rolls, and means for rotating said wiping members in opposite directions.

EUGENE G. BERRY.